US011890862B2

(12) United States Patent
Asada et al.

(10) Patent No.: US 11,890,862 B2
(45) **Date of Patent: *Feb. 6, 2024**

(54) IMAGE RECORDING DEVICE HAVING A COMPACT FORM FACTOR

(71) Applicant: BROTHER KOGYO KABUSHIKI KAISHA, Nagoya (JP)

(72) Inventors: Tetsuo Asada, Kuwana (JP); Hirotaka Aoki, Nagoya (JP); Satoru Nakakita, Nagoya (JP); Shota Iijima, Nagoya (JP); Kenji Samoto, Nagoya (JP); Yuji Koga, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,480

(22) Filed: Jul. 20, 2021

(65) Prior Publication Data

US 2022/0040995 A1 Feb. 10, 2022

Related U.S. Application Data

(63) Continuation of application No. 16/544,340, filed on Aug. 19, 2019, now Pat. No. 11,077,678, which is a (Continued)

(30) Foreign Application Priority Data

Dec. 29, 2009 (JP) ................................ 2009-299236
Dec. 29, 2009 (JP) ................................ 2009-299273

(51) Int. Cl.

*B41J 11/00* (2006.01)
*B41J 13/10* (2006.01)

(Continued)

(52) U.S. Cl.

CPC ............ *B41J 11/0045* (2013.01); *B41J 3/60* (2013.01); *B41J 11/58* (2013.01); *B41J 13/0045* (2013.01);

(Continued)

(58) Field of Classification Search

CPC . B41J 3/60; B41J 11/0045; B41J 11/58; B41J 13/0045; B41J 13/009; B41J 13/103;

(Continued)

(56) References Cited

U.S. PATENT DOCUMENTS 4,786,039 A 11/1988 Ito
5,132,741 A 7/1992 Kitajima et al.

(Continued)

FOREIGN PATENT DOCUMENTS

CN 1119991 A 4/1996
CN 1501185 A 6/2004

(Continued)

OTHER PUBLICATIONS

Notice of Allowance dated Feb. 19, 2014 from related U.S. Appl. No. 13/944,655.

(Continued)

*Primary Examiner* — Justin N Olamit
(74) *Attorney, Agent, or Firm* — Scully, Scott, Murphy & Presser, PC

(57) ABSTRACT

An image recording device is provided, having a recording unit configured to record an image on a sheet, and a tray disposed below the recording unit. The tray includes a sheet holding surface configured to hold the sheet. Additionally, the image recording device includes a sheet feeder disposed between the recording unit and the tray. The sheet feeder includes a roller for feeding the sheet from the tray. The roller is configured to move between a first roller position in which the roller contacts the sheet holding surface of the tray (Continued)

and a second roller position in which the roller is separated from the sheet holding surface. A return guide, disposed between the recording unit and the sheet feeder, defines a second conveying path to guide the sheet having an image recorded on one side thereof back to the feed guide. The return guide has a first opening configured to accommodate the roller of the sheet feeder when the roller is in the second roller position.

9 Claims, 7 Drawing Sheets

Related U.S. Application Data continuation of application No. 16/134,477, filed on Sep. 18, 2018, now Pat. No. 10,414,174, which is a continuation of application No. 15/276,206, filed on Sep. 26, 2016, now Pat. No. 10,086,629, which is a continuation of application No. 14/949,251, filed on Nov. 23, 2015, now Pat. No. 9,452,619, which is a continuation of application No. 14/727,290, filed on Jun. 1, 2015, now Pat. No. 9,283,778, which is a continuation of application No. 14/319,413, filed on Jun. 30, 2014, now Pat. No. 9,045,302, which is a continuation of application No. 12/892,390, filed on Sep. 28, 2010, now Pat. No. 8,768,235.

(51) Int. Cl.

| | |
|---|---|
| ***B41J 3/60*** | (2006.01) |
| ***B41J 13/00*** | (2006.01) |
| ***B41J 29/02*** | (2006.01) |
| ***B65H 3/06*** | (2006.01) |
| ***B65H 5/26*** | (2006.01) |
| ***B65H 1/08*** | (2006.01) |
| ***B41J 11/58*** | (2006.01) |

(52) U.S. Cl.

CPC ........... *B41J 13/103* (2013.01); *B41J 29/023* (2013.01); *B65H 1/08* (2013.01); *B65H 3/0684* (2013.01); *B65H 5/26* (2013.01); *B65H 2404/1521* (2013.01); *B65H 2405/1136* (2013.01); *B65H 2405/31* (2013.01); *G03G 2215/004* (2013.01); *G03G 2215/00396* (2013.01)

(58) Field of Classification Search

CPC .......... B41J 29/023; B65H 1/08; B65H 1/266; B65H 3/0684; B65H 5/26; B65H 2301/423245; B65H 2404/1521; B65H 2404/1136; B65H 2404/31; B65H 2404/324; G03G 15/6511; G03G 2215/00396; G03G 2215/004

See application file for complete search history.

(56) References Cited

U.S. PATENT DOCUMENTS

| | | | | |
|---|---|---|---|---|
| 5,284,333 | A | 2/1994 | Ishikawa | |
| 5,351,112 | A | 9/1994 | Naito et al. | |
| 5,364,195 | A | 11/1994 | Kanemitsu et al. | |
| 5,408,301 | A | 4/1995 | Tokishige et al. | |
| 5,727,890 | A | 3/1998 | Stodder et al. | |
| 5,791,645 | A | 8/1998 | Takada | |
| 5,799,237 | A | 8/1998 | Ueda et al. | |
| 5,953,575 | A | 9/1999 | Park et al. | |
| 6,078,345 | A | 6/2000 | Yamkawa et al. | |
| 6,088,135 | A | 7/2000 | Kusumoto | |
| 6,126,347 | A | 10/2000 | Sakaino et al. | |
| 6,152,561 | A | 11/2000 | Watanabe | |
| 6,185,381 | B1 | 2/2001 | Nakahara et al. | |
| 6,293,716 | B1 | 9/2001 | Driggers et al. | |
| 6,651,974 | B2 * | 11/2003 | Kawarama ............... | B65H 3/56 271/104 |
| 6,892,048 | B2 | 5/2005 | Eskey | |
| 6,909,872 | B2 | 6/2005 | Eskey | |
| 7,258,335 | B2 | 8/2007 | Johnson et al. | |
| 7,258,355 | B2 | 8/2007 | Amano | |
| 7,308,853 | B2 | 12/2007 | Satoh et al. | |
| 7,374,281 | B2 | 5/2008 | Saito et al. | |
| 7,413,183 | B2 | 8/2008 | Asada et al. | |
| 7,437,119 | B2 | 10/2008 | Takemoto et al. | |
| 7,469,981 | B2 | 12/2008 | Katsuyama et al. | |
| 7,527,264 | B2 | 5/2009 | Terada | |
| 7,614,738 | B2 | 11/2009 | Takeuchi | |
| 7,717,423 | B2 | 5/2010 | Litman et al. | |
| 7,778,572 | B2 | 8/2010 | Iijima | |
| 7,850,299 | B2 | 12/2010 | Hiroki et al. | |
| 7,887,044 | B2 | 2/2011 | Uchino et al. | |
| 7,959,147 | B2 | 6/2011 | Izuchi et al. | |
| 8,087,769 | B2 | 1/2012 | Hiroki et al. | |
| 8,144,374 | B2 | 3/2012 | Taniguchi | |
| 8,152,161 | B2 | 4/2012 | Samoto et al. | |
| 8,152,169 | B2 | 4/2012 | Samoto et al. | |
| 8,152,391 | B2 | 4/2012 | Asada | |
| 8,172,225 | B2 | 5/2012 | Tanahashi | |
| 8,208,180 | B2 | 6/2012 | Osakabe et al. | |
| 8,240,655 | B2 | 8/2012 | Samoto et al. | |
| 8,289,589 | B2 | 10/2012 | Matsushima | |
| 8,493,639 | B2 | 7/2013 | Samoto et al. | |
| 8,508,819 | B2 | 8/2013 | Asada et al. | |
| 8,764,006 | B2 | 7/2014 | Samoto et al. | |
| 8,765,235 | B2 | 7/2014 | Mizumura et al. | |
| 8,768,235 | B2 | 7/2014 | Asada et al. | |
| 9,045,302 | B2 | 6/2015 | Asada et al. | |
| 9,049,326 | B2 | 6/2015 | Miura et al. | |
| 9,051,144 | B2 | 6/2015 | Asada et al. | |
| 9,085,430 | B2 | 7/2015 | Samoto et al. | |
| 9,278,558 | B2 | 3/2016 | Asada et al. | |
| 9,283,778 | B2 | 3/2016 | Asada et al. | |
| 9,440,460 | B2 | 9/2016 | Asada et al. | |
| 9,452,619 | B2 | 9/2016 | Asada et al. | |
| 9,545,798 | B2 | 1/2017 | Asada et al. | |
| 9,821,967 | B2 | 11/2017 | Samoto et al. | |
| 10,086,629 | B2 | 10/2018 | Asada et al. | |
| 10,273,099 | B2 | 4/2019 | Samoto et al. | |
| 10,414,174 | B2 | 9/2019 | Asada et al. | |
| 10,668,746 | B2 | 6/2020 | Asada et al. | |
| 11,279,577 | B2 | 3/2022 | Samoto et al. | |
| 2001/0017439 | A1 | 8/2001 | Hiramatsu | |
| 2002/0084574 | A1 | 7/2002 | Kim | |
| 2002/0117800 | A1 | 8/2002 | Kawarama et al. | |
| 2004/0086310 | A1 | 5/2004 | Eskey | |
| 2004/0091300 | A1 | 5/2004 | Jang | |
| 2005/0194731 | A1 | 9/2005 | Ohama et al. | |
| 2006/0071399 | A1 | 4/2006 | Asada et al. | |
| 2006/0163799 | A1 | 7/2006 | Goh et al. | |
| 2006/0261535 | A1 | 11/2006 | Shiohara et al. | |
| 2006/0268089 | A1 | 11/2006 | Takeuchi | |
| 2007/0097458 | A1 | 5/2007 | Harada et al. | |
| 2007/0122225 | A1 | 5/2007 | Izuchi et al. | |
| 2007/0126837 | A1 | 6/2007 | Takahashi et al. | |
| 2007/0145670 | A1 | 6/2007 | Asada | |
| 2008/0240823 | A1 * | 10/2008 | Asada ...................... | B65H 5/36 399/401 |
| 2008/0240824 | A1 | 10/2008 | Asada | |
| 2009/0026685 | A1 | 1/2009 | Uchino et al. | |
| 2009/0087239 | A1 | 4/2009 | Uchino et al. | |
| 2009/0102908 | A1 | 4/2009 | Imoto | |
| 2009/0108516 | A1 | 4/2009 | Shigeno et al. | |
| 2009/0189966 | A1 | 7/2009 | Sugimoto et al. | |
| 2010/0231675 | A1 | 9/2010 | Kato | |
| 2010/0278575 | A1 | 11/2010 | Mizuno et al. | |
| 2011/0156338 | A1 | 6/2011 | Samoto | |
| 2011/0157664 | A1 | 6/2011 | Samoto | |
| 2011/0158725 | A1 | 6/2011 | Asada et al. | |
| 2011/0188097 | A1 | 8/2011 | Asada | |
| 2011/0291347 | A1 | 12/2011 | Sano et al. | |

(56) References Cited

U.S. PATENT DOCUMENTS

| | | | |
|---|---|---|---|
| 2011/0310206 | A1 | 12/2011 | Samoto et al. |
| 2011/0311294 | A1 | 12/2011 | Kawamata et al. |
| 2011/0317198 | A1 | 12/2011 | Suzuki |
| 2013/0300051 | A1 | 11/2013 | Samoto et al. |
| 2013/0321548 | A1 | 12/2013 | Asada et al. |
| 2014/0211274 | A1 | 7/2014 | Ohta |
| 2014/0312555 | A1 | 10/2014 | Samoto et al. |
| 2017/0120633 | A1 | 5/2017 | Asada et al. |

FOREIGN PATENT DOCUMENTS

| | | | |
|---|---|---|---|
| EP | 2082886 | A2 | 7/2009 |
| JP | 61-78138 | A | 5/1986 |
| JP | H02-295837 | A | 12/1990 |
| JP | H06-144633 | A | 5/1994 |
| JP | 2002-321838 | A | 11/2002 |
| JP | 2002-362766 | A | 12/2002 |
| JP | 2003-095475 | A | 4/2003 |
| JP | 2006-151639 | A | 6/2006 |
| JP | 2008-247537 | A | 10/2008 |
| JP | 2009-001412 | A | 1/2009 |
| JP | 2009-023831 | A | 2/2009 |
| JP | 2009-107803 | A | 5/2009 |
| JP | 2020-073415 | A | 5/2020 |

OTHER PUBLICATIONS

Japanese Office Action dated Oct. 15, 2013 received from Japanese Patent Office in counterpart Japanese Patent Application No. 2009-299254.
U.S. Office Action dated Dec. 10, 2013 in related U.S. Appl. No. 13/944,655.
Japanese Office Action dated Feb. 26, 2013 from related application JP 2009-299236 together with an English language translation.
Japanese Office Action dated Feb. 26, 2013 from related application JP 2009-299273 together with an English language translation.
Notice of Allowance dated Apr. 18, 2013 received in related U.S. Appl. No. 12/892,377.
Japanese Official Action dated Mar. 12, 2013 from related application JP 2009-299254 together with an English language translation.
Notice of Allowance dated Mar. 15, 2013 received in related U.S. Appl. No. 12/892,357.
Extended European Search Report dated Feb. 7, 2013 from related application EP 10011234.1-1251.
Extended European Search Report dated Feb. 1, 2013 from related application EP 10011233.3-1251.
Chinese Official Action dated Dec. 31, 2012 from related application CN 201010505634.4 together with an English language translation.
United States Official Action dated Jan. 3, 2012 from related U.S. Appl. No. 12/892,400.
United States Office Action dated Nov. 15, 2012 from related U.S. Appl. No. 12/892,357.
United States Office Action dated Nov. 28, 2012 from related U.S. Appl. No. 12/892,377.
U.S. Office Action dated Nov. 14, 2013 in related U.S. Appl. No. 12/892,390.
U.S. Office Action dated Jan. 11, 2013 in related U.S. Appl. No. 12/892,390.
U.S. Office Action dated May 17, 2013 in related U.S. Appl. No. 12/892,390.
Notice of Reasons for Rejection dated Aug. 19, 2014 received in related application JP 2013-149146 together with English language translation.
Notice of Allowance dated Jul. 22, 2015 received in related U.S. Appl. No. 14/727,290.
United States Official Action dated Dec. 31, 2015 received in related U.S. Appl. No. 14/949,233.
United States Official Action dated Jan. 6, 2016 received in related U.S. Appl. No. 14/949,251.
Notice of Allowance dated May 17, 2016 received in related U.S. Appl. No. 14/949,251.
Notice of Allowance dated Oct. 22, 2015 received in related U.S. Appl. No. 14/727,290.
Corrected Notice of Allowability dated Feb. 9, 2016 received in related U.S. Appl. No. 14/727,290.
Notice of Allowance dated May 18, 2015 received in related U.S. Appl. No. 14/319,413.
Notice of Allowance dated Feb. 20, 2014 received in related U.S. Appl. No. 12/892,390.
Notice of Allowance dated May 31, 2018 received in related U.S. Appl. No. 15/276,206.
U.S. Notice of Allowance dated May 17, 2013 received in U.S. Appl. No. 12/892,357.
U.S. Notice of Allowance dated Apr. 16, 2012 received in U.S. Appl. No. 12/892,400.
U.S. Notice of Allowance dated May 20, 2014 received in U.S. Appl. No. 13/944,655.
U.S. Office Action dated Jun. 23, 2015 received in U.S. Appl. No. 13/960,306.
U.S. Notice of Allowance dated Oct. 29, 2015 received in U.S. Appl. No. 13/960,306.
U.S. Notice of Allowance dated Feb. 5, 2015 received in U.S. Appl. No. 14/319,523.
U.S. Notice of Allowance dated Mar. 18, 2015 received in U.S. Appl. No. 14/319,913.
U.S. Notice of Allowance dated Apr. 21, 2015 received in U.S. Appl. No. 14/319,913.
U.S. Notice of Allowance dated May 22, 2015 received in U.S. Appl. No. 14/319,913.
U.S. Notice of Allowance dated Feb. 9, 2016 received in U.S. Appl. No. 14/727,290.
U.S. Notice of Allowance dated Jul. 7, 2017 received in U.S. Appl. No. 14/792,002.
U.S. Notice of Allowance dated Jul. 31, 2017 received in U.S. Appl. No. 14/792,002.
U.S. Notice of Allowance dated May 16, 2016 received in U.S. Appl. No. 14/949,233.
U.S. Notice of Allowance dated Sep. 9, 2016 received in U.S. Appl. No. 15/062,647.
U.S. Notice of Allowance dated Mar. 6, 2017 received in U.S. Appl. No. 15/405,910.
U.S. Notice of Allowance dated Apr. 13, 2017 received in U.S. Appl. No. 15/405,910.
U.S. Notice of Allowance dated Jul. 31, 2017 received in U.S. Appl. No. 15/405,910.
U.S. Office Action dated Sep. 6, 2017 received in U.S. Appl. No. 15/637,502.
Notice of Allowability dated Apr. 3, 2013 from parent U.S. Appl. No. 12/892,357.
Notice of Allowability dated Apr. 9, 2013 from parent U.S. Appl. No. 12/892,357.
Notice of Allowability dated May 7, 2013 from parent U.S. Appl. No. 12/892,357.
Notice of Allowability dated May 24, 2013 from parent U.S. Appl. No. 12/892,357.
Notice of Allowability dated Jun. 3, 2013 from parent U.S. Appl. No. 12/892,357.
Notice of Reasons for Refusal dated Apr. 12, 2022 received from the Japanese Patent Office in related JP 2021-087632 together with an English language translation.
U.S. Notice of Allowance dated Jan. 24, 2018 received in U.S. Appl. No. 15/637,502.
U.S. Office Action dated May 31, 2017 received in U.S. Appl. No. 15/276,206.
U.S. Office Action dated Feb. 23, 2017 received in U.S. Appl. No. 14/792,002.
U.S. Office Action dated Jan. 5, 2017 received in U.S. Appl. No. 15/276,206.
Notice of Allowance dated Nov. 20, 2017 received in related U.S. Appl. No. 15/276,206.
Notice of Allowance dated May 7, 2019 received in related U.S. Appl. No. 16/134,477.

(56) References Cited

OTHER PUBLICATIONS

Office Action dated Oct. 31, 2018 received in U.S. Appl. No. 15/816,395.
Notice of Allowance dated Dec. 17, 2018 received in U.S. Appl. No. 15/816,395.
Notice of Allowance dated Oct. 2, 2018 received in U.S. Appl. No. 15/974,891.
Office Action dated Oct. 9, 2020 issued in U.S. Appl. No. 16/889,126.
Notice of Allowance dated Jan. 27, 2020 issued in U.S. Appl. No. 16/214,954.
Office Action dated Nov. 17, 2020 issued in U.S. Appl. No. 16/363,266.
Office Action dated Mar. 13, 2020 issued in U.S. Appl. No. 16/544,340.
Office Action dated Jul. 27, 2020 issued in U.S. Appl. No. 16/544,340.
Official Action dated Feb. 9, 2021 received in Japanese Patent Application No. JP 2020-018613 together with an English language translation.
Notice of Allowance dated Mar. 31, 2021 issued in U.S. Appl. No. 16/544,340.
Office Action dated Nov. 25, 2022 received in U.S. Appl. No. 17/667,928.
Office Action dated Aug. 9, 2023 received in U.S. Appl. No. 17/667,928.
Notice of Reasons for Refusal dated Sep. 26, 2023 received in Japanese Patent Application No. JP 2022-163001.

* cited by examiner

IMAGE RECORDING DEVICE HAVING A COMPACT FORM FACTOR

CROSS REFERENCE TO RELATED APPLICATION

This application is a continuation application of U.S. patent application Ser. No. 16/544,340, which was filed on Aug. 19, 2019, which is a continuation of U.S. patent application Ser. No. 16/134,477, which was filed on Sep. 18, 2018, now U.S. Pat. No. 10,414,174, issued on Sep. 17, 2019, which is a continuation application of U.S. patent application Ser. No. 15/276,206, which was filed on Sep. 26, 2016, now U.S. Pat. No. 10,086,629, issued on Oct. 2, 2018, which is a continuation application of U.S. patent application Ser. No. 14/949,251, which was filed on Nov. 23, 2015, now U.S. Pat. No. 9,452,619, issued on Sep. 27, 2016, which is a continuation application of U.S. patent application Ser. No. 14/727,290, which was filed on Jun. 1, 2015, now U.S. Pat. No. 9,283,778, issued on Mar. 15, 2016, which is a continuation application of U.S. patent application Ser. No. 14/319,413, which was filed on Jun. 30, 2014, now U.S. Pat. No. 9,045,302, issued on Jun. 2, 2015, which is a continuation application of U.S. patent application Ser. No. 12/892,390, which was filed on Sep. 28, 2010, now U.S. Pat. No. 8,768,235, issued on Jul. 1, 2014 and claims priority from Japanese Patent Application Nos. 2009-299273 and 2009-299236, each of which was filed on Dec. 29, 2009, the disclosure of each of which is incorporated herein by reference in its entirety.

BACKGROUND OF THE INVENTION

1. Field of the Invention

This application relates to an image recording device configured to record an image on a sheet, and particularly to an image recording device configured to record an image on both sides of a sheet.

2. Description of Related Art

In a known image recording device, a sheet stored in a tray is fed by a feed roller and is conveyed by a convey roller to a recording unit. The recording unit records an image on one side of the sheet and the sheet is conveyed back to the convey roller along a return guide. The sheet is conveyed to the recording unit, and the recording unit records an image on the other side of the sheet. The sheet having an image on both sides of the sheet is discharged by the discharge roller to an output tray.

In the known image recording device, the feed roller is disposed between the tray and the return guide. The feed roller contacts the sheet in the tray when the feed roller feeds the sheet. The feed roller moves away from the sheet in the tray and retracts from the tray when the tray is inserted into and withdrawn from the recording device.

In the known image recording device, the return guide is disposed between the feed roller and the recording unit. A space for the feed roller to retract from the tray is limited by the return guide.

SUMMARY OF THE INVENTION

Therefore, a need has arisen for an image recording device which is configured to record an image on both sides of a sheet and has an adequate space for a feed roller to retract from a movable tray while the image recording device remains compact.

According to an embodiment of the invention, an image recording device is provided having a recording unit configured to record an image on a sheet; a tray disposed below the recording unit having a sheet holding surface configured to hold the sheet. The tray is configured to be inserted into and withdrawn from the image recording device. Additionally, the image recording device includes a sheet feeder disposed between the recording unit and the tray, which is configured to move with respect to the sheet holding surface of the tray. The sheet feeder includes a roller for feeding the sheet from the tray, the roller being configured to move between a first roller position in which the roller contacts the sheet holding surface of the tray and a second roller position in which the roller is separated from the sheet holding surface. A feed guide is configured to define a first conveying path to guide the sheet fed by the roller to the recording unit; and a return guide disposed between the recording unit and the sheet feeder is configured to define a second conveying path to guide the sheet having an image recorded on one side thereof back to the feed guide. The return guide has a first opening. At least a portion of the sheet feeder is accommodated in the first opening of the return guide when the roller is in the second roller position.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Embodiments of the invention and their features and technical advantages may be understood by referring to FIGS. 1-7, like numerals being used for like corresponding parts in the various drawings.

Figure 1:
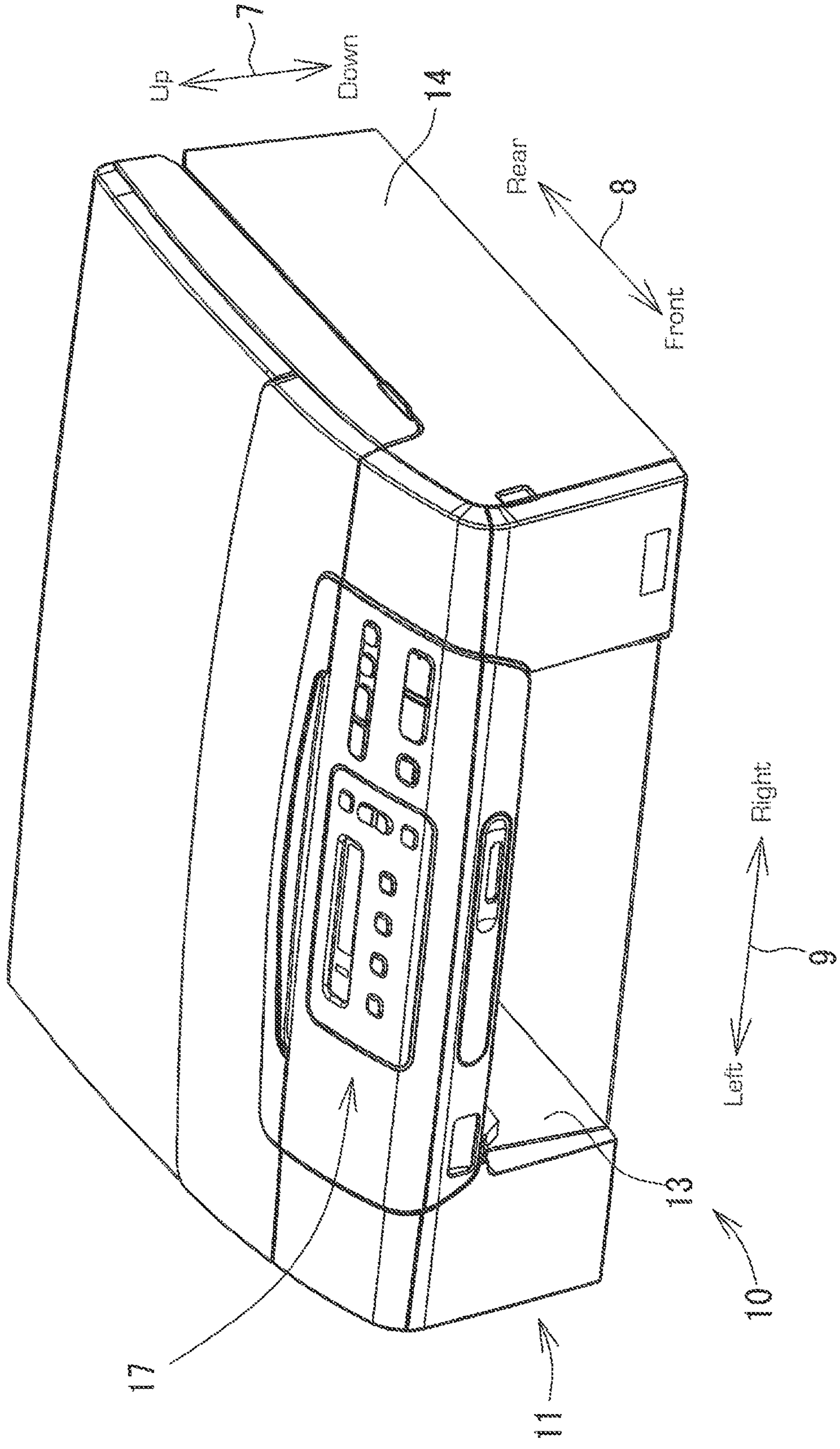
FIG. 1 is a perspective view of an image recording device, e.g., a multi-function device, according to an embodiment of the invention.

In the following description, the expressions “front”, “rear”, “upper”, “lower”, “right”, and “left” are used to define the various parts when an image recording device, e.g., a multi-function device 10, is disposed in an orientation in which it is intended to be used. As shown in FIG. 1, double-headed arrows 7, 8, 9 indicate up-to-down, front-to-rear, and right-to-left directions, respectively.

As shown in FIG. 1, the multi-function device 10 has a flat box shape and comprises, at a lower portion thereof, a printer 11 of an inkjet type. The multi-function device 10 may perform one or more functions, e.g., printing, copying, scanning, facsimile functions, or any combination thereof. The printer 11 may perform recording on both sides of a sheet. The printer 11 comprises a casing 14 having an opening 13 at the front of the multi-function device 10. A tray 20 is inserted into and withdrawn from the casing 14 through the opening 13 in the front-to-rear direction 8. An operation panel 17 is disposed at the front top of the multi-function device 10. The multi-function device including the printer 11 is operated by inputs from the operation panel 17.

Figure 2:
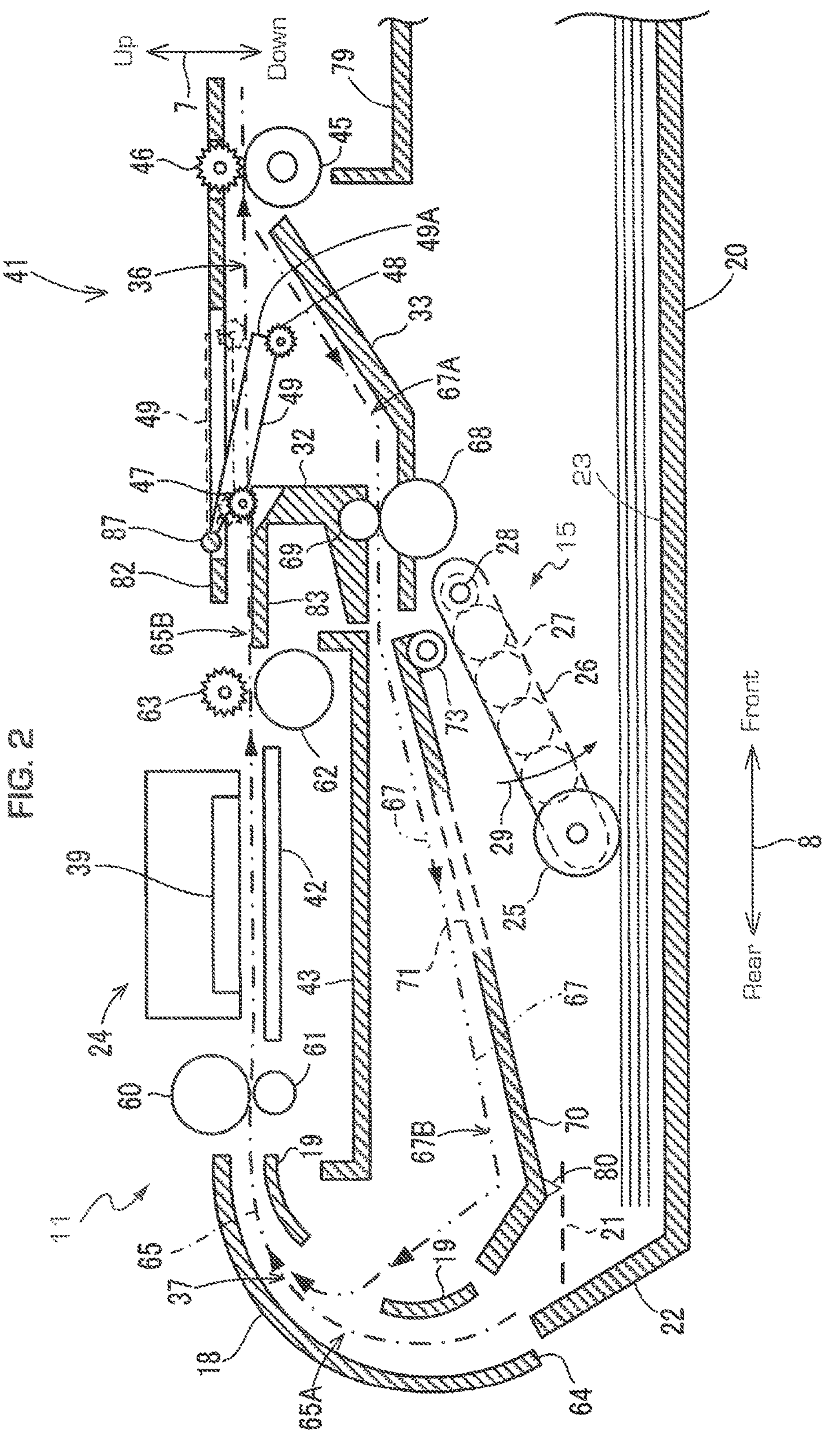
FIG. 2 is a schematic vertical cross-sectional side view of a printer of the image recording apparatus of FIG. 1.

A front side of the tray 20, i.e., a right side of the tray 20 in FIG. 2, is omitted from FIG. 2. As shown in FIG. 2, the printer 11 comprises a sheet feeder 15, a recording unit 24 of an inkjet type, and a path switching unit 41. The sheet feeder 15 picks up and feeds a recording medium, e.g., a sheet from the tray 20. The recording unit 24 ejects ink droplets onto the sheet fed by the sheet feeder 15 to record an image on the sheet. Alternatively, the recording unit 24 may be of an electrophotographic type or other types.

A conveying path 65 is formed in the printer 11 and extends from a rear end of the tray 20, via the recording unit 24, to a sheet receiver 79. The conveying path 65 comprises a curved path 65A extending from the rear end of the tray 20 to recording unit, and a discharging path 65B extending from the recording unit 24 to the sheet receiver 79.

The inclined plate 22 is disposed at the rear end of the tray 20, stands slantingly upward, and extends in the left-to-right direction 9 (as shown in FIG. 1), i.e., a direction perpendicular to the drawing sheet plane of FIG. 2. The inclined plate 22 may be formed integrally with the tray 20 and guides a leading edge of the sheet toward the curved path 65A. The inclined plate 22 is inclined at such an angle that a sheet placed on a sheet holding surface 23 of the tray 20 is guided smoothly to the curved path 65A. The inclined plate 22 forms an obtuse angle with the sheet holding surface 23 of the tray 20.

The curved path 65A has a shape of substantially an arc with a center located on an inner side of the printer 11. The sheet fed from the tray 20 is guided to the recording unit 24 along the curved path 65A. The curved path 65A is defined by a curved guide comprising an outer guide 18 and an inner guide 19 that are opposed to each other with an interval therebetween. The outer guide 18 and the inner guide 19 extend in the right-to-left direction 9 in FIG. 1, i.e. in a direction perpendicular to the drawing sheet plane of FIG. 2. An upper guide 82, a lower guide 83, an upper guide 32, a lower inclined guide 33, and a support member 43, which will be described later, also extend in the right-to-left direction 9.

Figure 4:
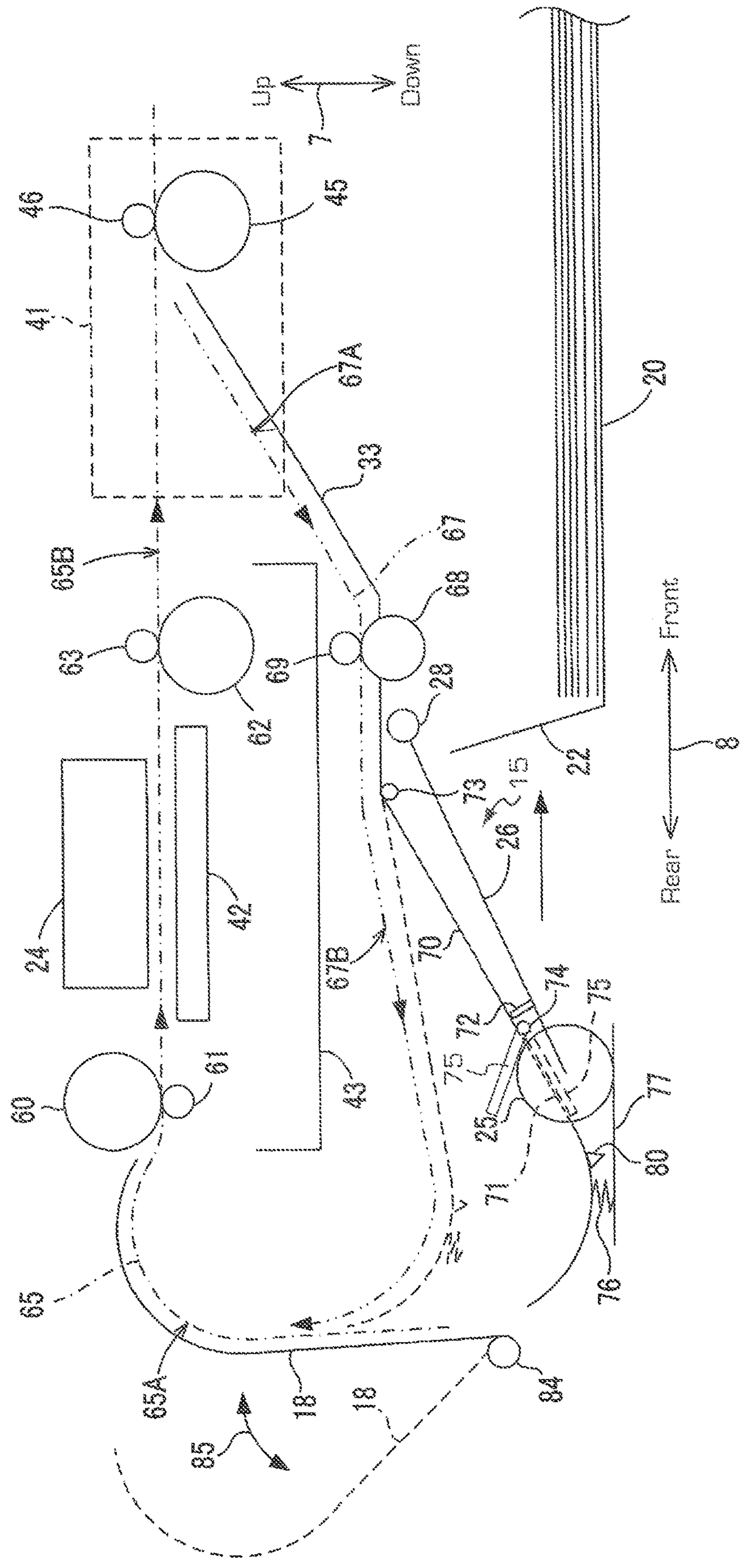
FIG. 4 is a schematic vertical cross-sectional side view of the printer in which the feed roller is in a fourth roller position and the return guide is in a third guide position.

As shown in FIG. 4, the outer guide 18 is configured to pivot about a shaft 84 in a direction indicated by an arrow 85. The outer guide 18 may be pivoted manually by a user of the multi-function device 10.

The discharging path 65B is a linear path extending from a downstream side of the recording unit 24 in a first conveying direction to the sheet receiver 79. The first conveying direction in which the sheet is conveyed along the conveying path 65 is indicated by a one-dot-one-dash line with arrows.

A branch port 36 is formed on the downstream side of the recording unit 24 in the first conveying direction. The sheet is switchbacked in a reverse direction on the downstream side of the branch port 36 and is directed toward a second conveying path, e.g., a return path 67.

The recording unit 24 is disposed above the tray 20 and reciprocates in the right-to-left direction 9, i.e., in a direction perpendicular to the drawing sheet plane of FIG. 2. A platen 42 is disposed below the printing unit 24 to support the sheet horizontally. The printing unit 24 ejects from nozzles ink supplied from an ink cartridge (not shown) onto the sheet conveyed on the platen 42, and records an image on the sheet.

A first convey roller 60 and a pinch roller 61 are disposed between a downstream end of the curved path 65A and the recording unit 24. The pinch roller 61 is pressed against a roller surface of the first convey roller 60 by an elastic member (not shown), e.g., a spring. The first convey roller 60 and the pinch roller 61 pinch the sheet conveyed along the curved path 65A and convey the sheet onto the platen 42. A second convey roller 62 and a spur roller 63 are disposed between the recording unit 24 and an upstream end of the discharging path 65B. The spur roller 63 is pressed against a roller surface of the second convey roller 62 by an elastic member (not shown). The second convey roller 62 and the spur roller 63 pinch the sheet having an image recorded thereon and convey the sheet downstream in the first conveying direction toward the sheet receiver 79.

The first convey roller 60 and the second convey roller 62 rotate by being driven by a sheet convey motor (not shown) via a transmission mechanism (not shown).

The sheet feeder 15 is disposed between the recording unit 24 and the tray 20, i.e., disposed below the recording unit 24 and above the tray 20. The sheet feeder 15 conveys the sheets held in the tray 20 toward the curved path 65A. The sheet feeder 15 comprises a feed roller 25, an arm 26, and a transmission mechanism 27.

The feed roller 25 picks up an uppermost one of the sheets held in the tray 20 and feeds the uppermost sheet toward the curved path 65A. The feed roller 25 is rotatably supported at a free end of the arm 26. The feed roller 25 rotates by being driven by a sheet feed motor (not shown) via a transmission mechanism 27. The transmission mechanism 27 comprises gears rotatably supported by the arm 26 and arranged substantially linearly.

A base end of the arm 26 is supported on a shaft 28 such that the arm 26 pivots about the shaft 28. The arm 26 moves vertically with respect to the tray 20, i.e., moves close to and away from the tray 20. The arm 26 is urged in a direction indicated by an arrow 29 by its own weight and/or by an elastic member, e.g., a spring. This allows the feed roller 25 to move to a first roller position in which the feed roller 25 contacts the sheet holding surface of the tray 20 or the uppermost one of the sheets held in the tray 20.

Figure 5:
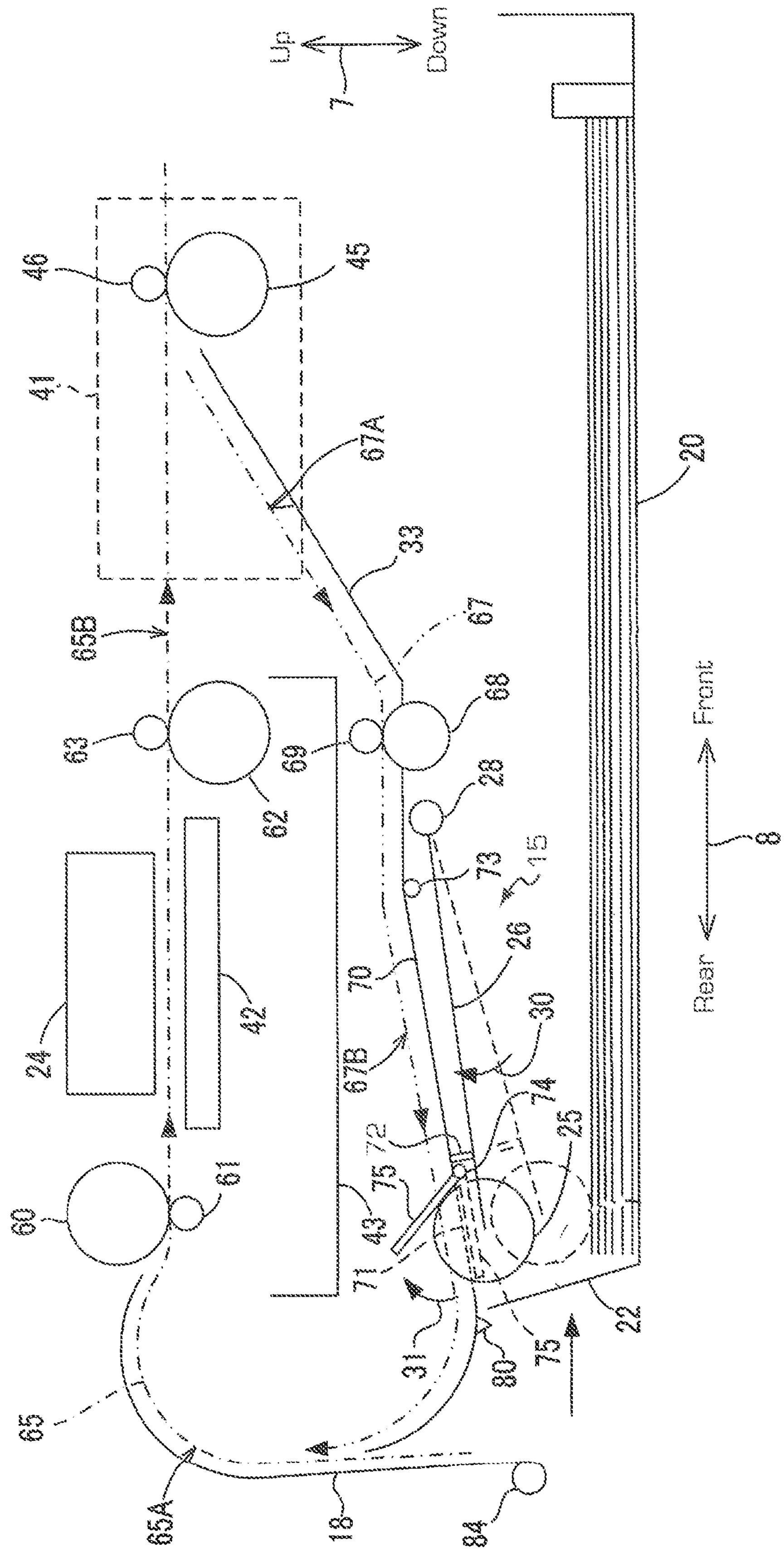
FIG. 5 is a schematic vertical cross-sectional side view of the printer in which the feed roller is in a second roller position and the return guide is in the first guide position.
Figure 6:
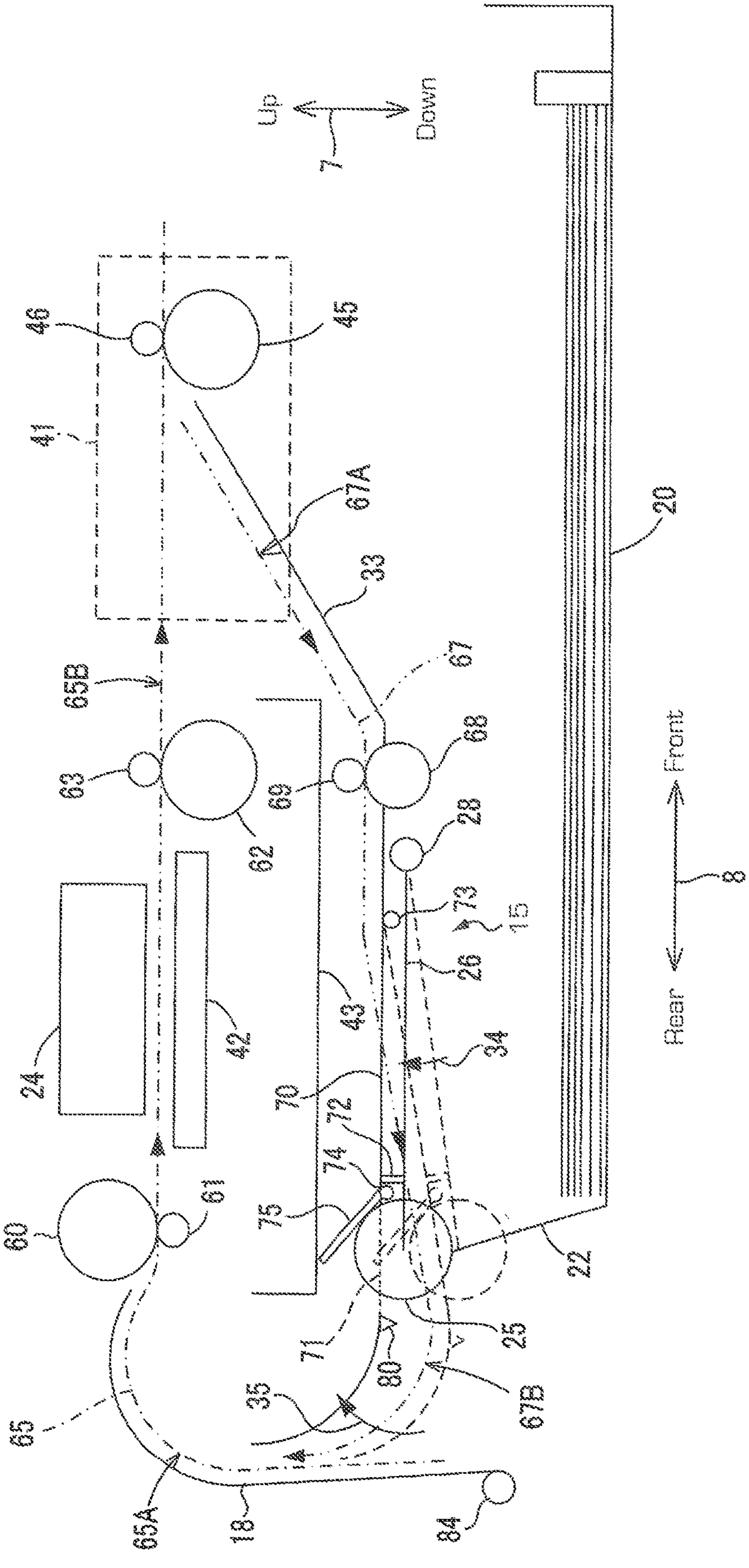
FIG. 6 is a schematic vertical cross-sectional side view of the printer in which the feed roller is in a third roller position and the return guide is in a second guide position.

As shown in FIGS. 5 and 6, the sheet feeder 15 is pushed up by an upper surface of a side wall 21 (shown in FIG. 2) of the tray 20 and/or an upper surface of the inclined plate 22, when the tray 20 is inserted into or withdrawn from the printer 11. As shown in FIGS. 5 and 6, during insertion/withdrawal of the tray 20 into/from the printer 11, the sheet feeder 15 is pushed up by the upper surface of the side wall 21 (FIG. 2) of the tray 20 and/or the upper surface of the inclined plate 22. Consequently, the feed roller 25 moves away from the sheet holding surface 23 to a second roller position and a third roller position. The feed roller 25, located in the third roller position, is retracted upward from a tray insertion/withdrawal zone, i.e. the space in the printer 11 provided to hold the tray 20 when the tray 20 is fully and properly inserted. The feed roller 25, located in the third roller position, is closer to the recording unit 24 than the feed roller 25 located in the second roller position.

The sheet feeder 15 may be pushed by the inclined plate 22 (FIG. 6) and/or the side wall 21 (FIG. 2) of the tray 20 when the tray is inserted into or withdrawn from the printer 11. During insertion or withdrawal of the tray 20, the sheet feeder 15 is guided up or down by the upper surface of the side wall 21 (FIG. 2). A guide member (not shown) may be provided on the sheet feeder 15, which extends from the sheet feeder in a left-right direction to contact the upper surface of the side wall 21. The guide member rests on, and is guided by, the upper surface of the side wall 21. Alternatively, the feed roller 25 contacts the inclined plate 22 during withdrawal of the tray 20. Consequently, as the tray 20 is withdrawn, the feed roller 25 rolls up along the inclined plate 22, thus pushing the sheet feeder 15 upwards.

As shown in FIG. 4, when the tray 20 has been withdrawn from the printer 11, the feed roller 25 rests against a frame 77 or the like of the multi-function device 10 because the arm 26 is urged in the direction indicated by the arrow 29 (FIG. 2). At this time, the arm 26 pivots such that the feed roller 25 moves to a fourth roller position lower than the first roller position. In short, when the tray 20 is inserted into or withdrawn front the printer 11, the feed roller 25 moves among the first, second, third, and fourth roller positions.

As shown in FIG. 2, the path switching unit 41 is disposed in the conveying path 65, in the vicinity of a branch port 36. The path switching unit 41 comprises a third convey roller 45, a spur roller 46, and a flap 49.

The third convey roller 45 is disposed downstream of the lower guide 83 and is rotatably supported by a frame or the like of the printer 11. The spur roller 46 is pressed against a roller surface of the third convey roller 45 by its own weight and/or by an elastic member, e.g., a spring (not shown).

The third covey roller 45 is driven by the sheet convey motor (not shown) such that the third convey roller 45 rotates either in a forward direction or in a reverse direction. The third convey roller 45 may be configured to rotate in the forward direction when the printer 11 records on a single side of the sheet. In this case, the third convey roller 45 and the spur roller 46 convey the sheet downstream and discharge the sheet onto the sheet receiver 79. When the printer 11 records on both sides of the sheet, the rotation direction of the third convey roller 45 may be reversed into the reverse direction while a trailing edge of the sheet is pinched by the rollers 45, 46.

As shown in FIG. 2, the flap 49 extends from a shaft 87 toward a downstream side in the discharging path 65B. The shaft 87 is disposed on a frame or the like of the printer 11 and extends in a direction perpendicular to the drawing sheet plane of FIG. 2, i.e., in the right-to-left direction 9 in FIG. 1. The flap 49 is pivotally supported on the shaft 87. Auxiliary rollers 47, 48 in the form of spur rollers, are rotatably supported by the flap 49.

The flap 49 is configured to pivot between a discharge position indicated by a broken line in FIG. 2 and a reverse position indicated by a solid line in FIG. 2. When the flap 49 is in the discharge position, the flap 49 is positioned above the lower guide 83, and the sheet having passed the recording unit 24 is conveyed downstream in the first conveying direction. When the flap 49 is in the reverse position, a free end 49A of the flap 49 is located below the branch port 36, and the sheet having passed the recording unit 24 is switch-backed and conveyed along the reverse path 67.

The reverse path 67 guides the sheet from a downstream side of the recording unit 24 in the first conveying direction to an upstream side of the first convey roller 60 in the first conveying direction. The reverse path 67 branches off the discharging path 65B at the branch port 36, extends below the recording unit 24 and above the tray 20, and merges with the curved path 65A at a merge port 37. The sheet is conveyed along the reverse path 67 in a second conveying direction indicated by a two-dot-one-dash line with arrows in FIG. 2. The reverse path 67 guides the sheet having an image recorded on one side of the sheet by the recording unit 24 to the curved path 65A.

The reverse path 67 includes a first path 67A and a second path 67B. The first path 67A is defined by an upper guide 32 and a lower inclined guide 33. The lower inclined guide 33 has an inclined surface extending downward and rearward from the branch port 36.

The second path 67B is defined by a return guide 70 and the support member 43. The return guide 70 is configured to pivot in directions indicated by arrows 31 and 35 in FIGS. 5 and 6. The support member 43 is attached to the frame of the printer 11 to support the recording unit 24.

A fourth convey roller 68 and a spur roller 69 are disposed in the reverse path 67. The spur roller 69 is pressed against the fourth convey roller 68 by its own weight and/or by an elastic member, e.g., a spring (not shown). The fourth convey roller 68 is driven by the sheet convey motor (not shown) and rotates in such a direction that the sheet is conveyed in the second conveying direction.

The return guide 70 is disposed between the recording unit 24 and the sheet feeder 15. The return guide 70 has substantially a flat rectangular shape and has a dimension in the top-to-bottom direction 7 which is smaller than dimensions in the front-to-rear direction 8 and in the right-to-left direction 9. A free end (rear end) of the return guide 70 is inclined and curved upward. The reverse path 67 and the curved path 65A are substantially arcuate. Accordingly, the sheet conveyed along the reverse path 67 is smoothly guided into the curved path 65A.

The return guide 70 is supported, at its base end (front end), on a shaft 73 such that the return guide 70 pivots about the shaft 73. The return guide 70 moves vertically toward and away from the recording unit 24.

The return guide 70 changes its position while pivoting. When the return guide 70 is in a first guide position (shown in FIG. 3), the return guide 70 partially defines the reverse path 67. The return guide 70 located in a second guide position (shown in FIG. 6) is closer to the recording unit 24 than the return guide 70 located in the first guide position. The return guide 70 located in a third guide position (shown in FIG. 4) is farther from the recording unit 24 than the return guide 70 located in the first guide position.

Figure 3:
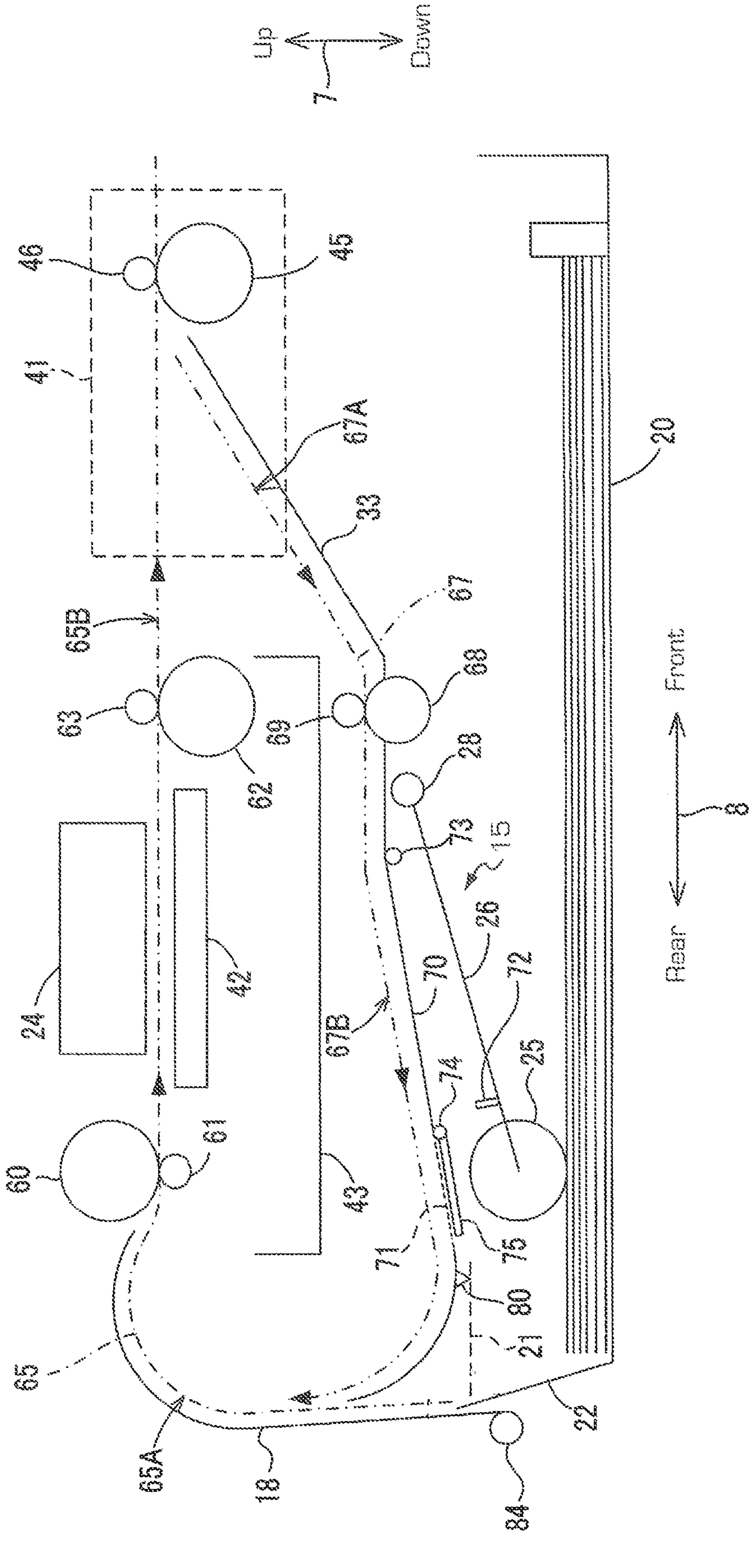
FIG. 3 is a schematic vertical cross-sectional side view of the printer in which a feed roller is in a first roller position and a return guide is in a first guide position.

As shown in FIGS. 2 and 3, when the return guide 70 is in the first guide position, a predetermined clearance is formed between an upper surface of the return guide 70 and a lower surface of the support member 43 such that the sheet is conveyed through the clearance. The return guide 70 located in the first guide position is supported by side walls 21 of the tray 20. The side walls 21 stand upright respectively from opposed ends of a bottom plate of the tray 20 in the right-to-left direction 9, and extend in the front-to-rear direction 8. In FIGS. 2 and 3, upper ends of the side walls 21 are indicated by a broken line. Supported portions 80 are projected from a lower surface of the return guide 70 and contact the side walls 21 respectively when the return guide 70 is in the first guide position. The side walls 21 are omitted from FIGS. 4-6.

As shown in FIG. 6, the return guide 70 moves to the second guide position close to the support member 43 when a lower surface of the reverse member 70 is pushed up by the sheet feeder 15. As shown in FIG. 4, the return guide 70 moves to the third guide position when the tray 20 has been withdrawn from the printer 11. At this time, the lower surface of the return guide 70 is no longer supported by the side walls 21 of the tray 20, and the return guide 70 moves to a position close to and above the frame 77 as the feed roller 25 of the sheet feeder 15 moves to the fourth roller position.

The return guide 70 has a first opening 71 at a position opposed to the feed roller 25. More specifically, as shown in FIG. 5, the return guide 70 has the first opening 71 at a position in which at least a portion of the feed roller 25 and the arm 26, e.g., a roller surface projected beyond an upper surface of the arm 26 and/or the upper surface of the arm 26, contacts the return guide 70 when the return guide 70 is in the first guide position, unless the first opening 71 is formed.

Figure 2A:
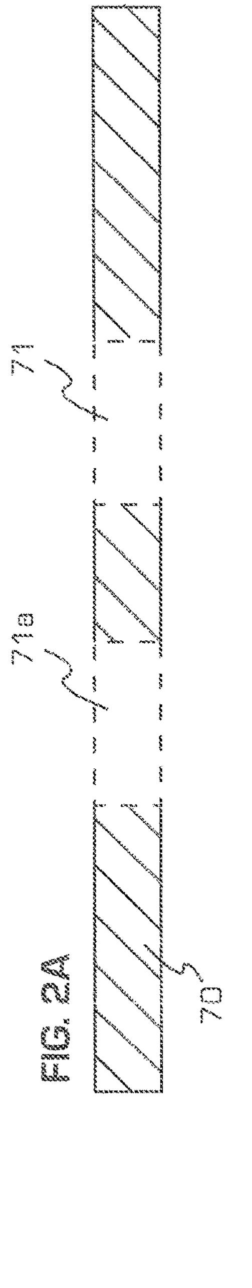
FIG. 2A is a schematic vertical cross-sectional side view of an alternative embodiment of the return guide 70 shown in FIG. 2.

In this embodiment, the return guide 70 has a single opening, i.e the first opening 71. However, as shown in FIG. 2A, the first opening 71 and a second opening 71*a* may be formed separately in the return guide 70 when a contact position in which the feed roller 25 contacts the return guide 70 located in the third guide position is different from a contact position in which the feed roller 25 contacts the return guide 70 located in the first guide position, depending on the relative positional relation between the return guide 70 and the feed roller 25.

Specifically, because the return guide 70 and the sheet feeder 15 have different rotational axes, namely respective shafts 73 and 28, the feed roller 25 may not contact the return guide 70 at the same location at each combination of roller and guide positions. The different contact points result from the distance between the axis 28 of the sheet feeder 15 and the axis 73 of the return guide 70; as the distance between axis 28 and axis 73 is increased, the separation between the contact points increases. When the separation between the contact points is small, a single enlarged opening, i.e. first opening 71, is adequate to accommodate the feed roller at the various contact points. However, if the first opening 71 is enlarged beyond a threshold size, sheets moving along the reverse path 67 may snag onto an edge of the first opening 71, resulting in a significant increase in paper jams. Consequently, formation of the second opening 71*a* allows the size of the first opening 71 to be minimized.

As shown in FIG. 4, a portion of the feed roller 25 located in the fourth roller position penetrates the opening 71 of the return guide 70 located in the third guide position, and the portion of the feed roller 25 projects upward beyond the sheet conveying surface of the return guide 70. As shown in FIG. 5, a portion of the feed roller 25 moving to the second roller position penetrates the opening 71 of the return guide 70 located in the first guide position, and the portion of the feed roller 25 projects upward beyond the sheet conveying surface of the return guide 70.

As shown in FIG. 3, a stopper, e.g., a projection 72, is disposed adjacent to the feed roller 25, on an upper surface of the arm 26. As shown in FIG. 5, the projection 72 contacts a lower surface of the return guide 70 when the feed roller 25 moves to the second roller position while pushing up a cover member 75. The projection 72 may be formed at other positions so long as the projection 72 prevents the roller surface of the feed roller 25 from colliding with the return guide 70.

As shown in FIG. 3, the return guide 70 comprises the cover member 75, e.g., a plate member, having substantially a same shape as the opening 71. A base end of the cover member 75 is supported on a shaft 74 such that the cover member 75 pivots about the shaft 74 so as to open and close the opening 71. The shaft 74 is disposed at a position adjacent to an end of the opening 71 on a side near the shaft 73. The cover member 75 is provided to minimize paper jams by covering the first opening 71. However, the cover member 75 may be optional.

The cover member 75 is urged downward by its own weight and/or by an elastic member, e.g., a spring (not shown), and is restricted by a restricting member (not shown) so as not to pivot downward beyond a position to close the opening 71, as shown in FIG. 3. When the feed roller 25 is in the first roller position, the cover member 75 closes the opening 71 and partially defines the sheet conveying surface of the return guide 70. When the feed roller 25 moves to the second roller position, the cover member 25 is pushed by the feed roller 25 to pivot upward and open the opening 71.

Although the cover member 75 shown in FIGS. 3 and 6 is provided so as to open and close the opening 71 through which a portion of the feed roller 25 penetrates, the cover member 75 may be provided so as to open and close an opening through which a portion of the sheet feeder 15, including the feed roller 25 and the arm 26, penetrates.

Further, instead of pivoting, the cover member 75 may slide parallel with the sheet conveying surface of the return guide 70 to open and close the opening 71.

As shown in FIG. 4, an elastic member 76, e.g., a spring or a rubber chip, is attached to a lower surface of the return guide 70 which is opposite to the sheet conveying surface. The elastic member 76 is disposed at the lowest position of the return guide 70 located in the third guide position. When the return guide 70 moves to the third guide position, the elastic member 76 contacts the frame 77 of the multifunction device 10. The elastic member 76 is omitted from the figures except for FIG. 4.

Movements of the sheet feeder 15 and the return guide 70 will now be explained in detail. As shown in FIG. 3, during image recording, the feed roller 25 is in the first roller position, and the return guide 70 is in the first guide position. When the tray 20 is being withdrawn from the printer 11 before and after image recording, the return guide 70 pivots from the first guide position to the second guide position as the feed roller 25 moves from the first roller position, via the second roller position, to the third roller position. When the tray 20 has been withdrawn from the printer 11, the feed roller 25 moves from the third roller position to the fourth roller position, and the return guide 70 moves from the second guide position to the third guide position.

More specifically, when the tray 20 is withdrawn from the printer 11 frontward from a state shown in FIG. 3, the arm 26 is pushed by the tray 20 to pivot upward, and the feed roller 25 moves up. As a result, the feed roller 25 moves from the first roller position to the second roller position. When the feed roller 25 moves up from the first roller position by a predetermined distance, the feed roller 25 contacts the cover member 75.

Then, as shown in FIG. 5, as the tray 20 is further withdrawn frontward, the arm 26 pivots upward further in the arrow direction 30, and the cover member 75 is pushed by the feed roller 25 to pivot upward in the arrow direction 31. At this time, the projection 72 contacts the lower surface of the return guide 70. Then, as shown in FIG. 6, when the arm 26 pivots upward further in the arrow direction 34, the return guide 70 is pushed by the projection 72 and pivots upward integrally with the sheet feeder 15 in the arrow direction 35. The projection 72 functions as an actuating member that actuates the return guide 70 to pivot from the first guide position to the second guide position in response to the feed roller moving from the second roller position to the third roller position, as the arm 26 pivots upward.

The return guide 70 continues to pivot until the feed roller 25 contacts an upper end of the inclined plate 22, as shown in FIG. 6. In FIG. 6, the feed roller 25 is in the third roller position, and the return guide 70 is in the second guide position.

In FIG. 6, the sheet feeder 15, including the feed roller 25 located in the third roller position, is indicated by a solid line. The return guide 70 located in the first guide position is indicated by a broken line. A space occupied by the sheet feeder 15, including the feed roller 25 located in the third roller position, overlaps a space occupied by the return guide 70 located in the first guide position.

As shown in FIG. 6, when the feed roller 25 is in the third roller position, a longitudinal direction of the arm 26 of the sheet feeder 15 is substantially parallel with the sheet conveying surface of the return guide 70 located in the second guide position.

When the tray 20 is completely withdrawn from the printer 11 from a state shown in FIG. 6, the sheet feeder 15 is no longer supported by the tray 20 or the inclined plate 22. The sheet feeder 15, which is urged in the arrow direction 29 (FIG. 2), pivots downward. As shown in FIG. 4, the feed roller 25 moves to the fourth roller position in which a lower surface of the feed roller 25 is lower than the sheet holding surface 23 of the tray 20.

As described above, when the tray 20 is completely withdrawn from the printer 11, the return guide 70 pivots to the third guide position thereby to increase a space between the recording unit 24 and the return guide 70. Any sheet jammed in the return guide 70 may readily removed by pivoting the outer guide 18 relative to the multi-function device 10.

In the above-described embodiment, when the return guide 70 pivots downward to the third guide position, a portion of the feed roller 25 penetrates the opening 71 and projects beyond the sheet conveying surface of the return guide 70. This allows access to and cleaning of the feed roller 25.

In the above-described embodiment, when the tray 20 is inserted into and withdrawn from the printer 11, a portion of the feed roller 25 projects through the opening 71 upward beyond the sheet conveying surface of the return guide 70 located in the first guide position. A space for the feed roller 25 to retract away from the tray 20 overlaps an upper space defined by the sheet conveying surface of the return guide 70. This may make the multi-function device 10 compact while ensuring the space for the feed roller 25 to retract.

In the above-described embodiment, the projection 72 actuates, as an actuator, the return guide 70 to pivot to the second guide position in response to the movement of the feed roller 25 to the third roller position. Also, the projection 72 prevents, as a stopper, the surface of the feed roller 25 from contacting the return guide 70. The number of parts provided in the multi-function device 10 may be reduced compared when an actuator and a stopper are provided separately, and thus the multi-function device may be made compact.

In the above-described embodiment, a longitudinal direction of the arm 26 when the feed roller 25 is in the third roller position is parallel with the sheet conveying surface of the return guide 70 located in the second guide position. This may reduce a distance between the arm 26 and the return guide 70, and accordingly may make the multi-function device 10 compact.

In the above-described embodiment, the cover member 75 disposed in the return guide 70 is configured to close the opening 71 of the return guide 70 when the sheet is conveyed along the reverse path 67. The cover member 75 may prevent the sheet from being stuck in the opening 71 without substantially increasing the thickness of the return guide 70.

In the above-described embodiment, the opening 71 of the return guide 70 serves as an opening for accommodating a portion of the feed roller 25 when the return guide 70 moves to the third guide position. The opening 71 also serves as an opening for accommodating a portion of the feed roller 25 when the return guide 70 is located in the first guide position and in the second guide position. Accordingly, the number of openings formed in the return guide 70 may be reduced, and the chances that any sheet is stuck in the openings may be reduced.

In the above-described embodiment, when the return guide 70 pivots down to the third guide position upon withdrawal of the tray 20 from the printer 11, the elastic member 76 of the return guide 70 damps an impact of the return guide 70 abutting against a return guide receiving surface, i.e., the frame 77. Accordingly, the noise generated when the return guide 70 abuts against the frame 77 may be reduced.

Although, in the above-described embodiment, a portion of the feed roller 25 penetrates the opening 71 of the return guide 70 when the tray 20 is inserted into or withdrawn from the multi-function device 10, a portion of the feed roller 25 may not necessarily penetrate the opening 71. A portion of the feed roller 25 may be accommodated in the opening 71 without projecting beyond the sheet conveying surface of the return guide. Further, in addition to or instead of a portion of the feed roller 25, another portion of the sheet feeder 15 may penetrate the opening 71 or may be accommodated in the opening 71. For example, a portion of a roller cleaner, which may be disposed on the arm 26 so as to extend over and to lightly contact the feed roller 25, may penetrate the opening 71 or may be accommodated in the opening 71. A portion of one or more of the gears of the transmission mechanism 27, which may be rotatably supported by the arm 26 and may have a relatively large diameter, may penetrate the opening 71 or may be accommodated in the opening 71.

Although, in the above-described embodiment, the projection 72 of the sheet feeder 15 functions as an actuator to actuate the return guide 70 to move integrally with the sheet feeder 15, the arm 26 of the sheet feeder 15 may function as the actuator, according to another embodiment of the invention. In this case, when the arm 26 pivots upward, the arm 26, itself, instead of the projection 72, may be configured to contact the lower surface of the return guide 70 and to move up the return guide 70 integrally with the pivoting arm 26. In such an embodiment, when the return guide 70 moves up to the second guide position, the sheet feeder 15 is allowed to move into a space that was occupied by the return guide 70 located in the first guide position. This may make the multi-function device 10 compact while ensuring the space for the sheet feeder 15 to retract away from the tray 20.

Figure 7:
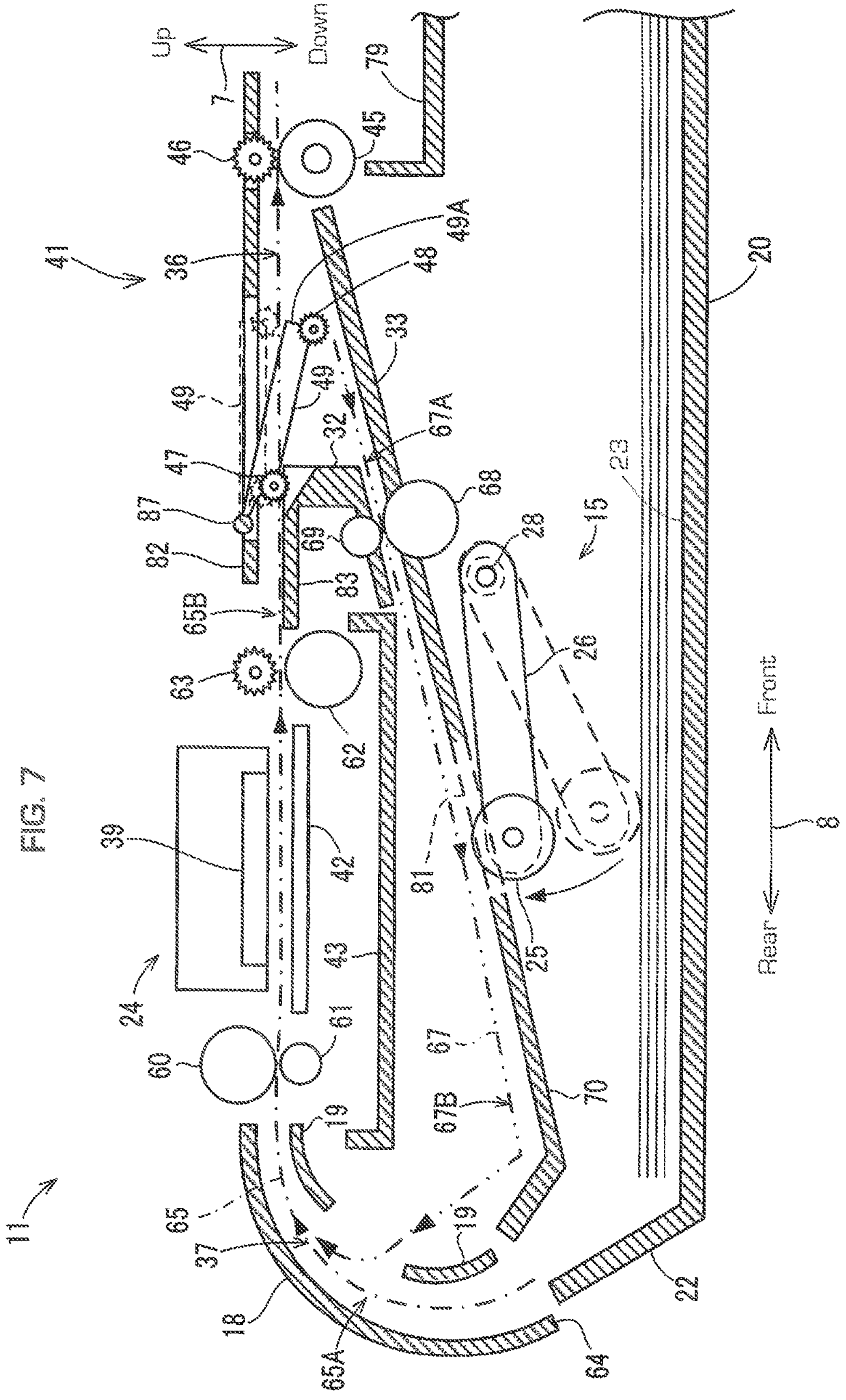
FIG. 7 is a schematic vertical cross-section side view of a printer, according to another embodiment of the invention.

According to still another embodiment of the invention, the reverse path 67 may be partially defined by a stationary member, e.g., a stationary lower guide 33, as shown in FIG. 7. In this case, the reverse path 20 may be defined by the upper guide 32, the support member 43, which are disposed on an upper side, and the lower guide 33 disposed on a lower side.

In this embodiment, as shown in FIG. 7, the sheet feeder 15 is configured to pivot such that the feed roller 25 moves between a first roller position indicated by a broken line and a second roller position indicated by a solid line. When the feed roller 25 is in the first roller position, the feed roller 25 contacts the sheet conveying surface of the tray 20 or an uppermost one of the sheets held in the tray 20. When the feed roller 25 is in the second roller position, the feed roller 25 is separated from the sheet conveying surface or the uppermost one of the sheets held in the tray 20. The sheet feeder 15 shown in FIG. 7 is configured to pivot in the same manner as the sheet feeder 15 shown in FIG. 2. The lower guide 33 has an opening 81. When the feed roller 25 moves to the second roller position, a portion of the feed roller 25 penetrates the opening 81 and projects beyond a sheet conveying surface of the lower guide 33. The opening 81 functions in the same manner as the opening 71 shown in FIG. 2.

When the tray 20 is inserted into and withdrawn from the printer 11, the sheet feeder 15 is configured to pivot such that the feed roller 25 retracts upward from the tray 20 to the second roller position. A space for the feed roller 25 to retract away from the tray 20 overlaps an upper space defined by the sheet conveying surface of the lower guide 33. This may make the multi-function device 10 compact while ensuring the space for the feed roller 25 to retract from the tray 20.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image recording device comprising:

a tray configured to hold a sheet thereon;

a sheet feeder configured to feed the sheet on the tray, the sheet feeder comprising an arm and a roller rotatably supported by the arm, the arm being configured to pivot about a pivot axis such that the roller moves between a first roller position and a second roller position which is above the first roller position;

a recording unit configured to record an image on the sheet fed by the roller of the sheet feeder; and a return guide comprising an upper surface, a lower surface opposite to the upper surface, and a cover member, the upper surface being configured to guide the sheet having the image recorded thereon back toward the recording unit in a return direction, where the pivot axis of the sheet feeder is located between a portion of the upper surface of the return guide and the tray, and wherein the arm includes a portion configured to contact the lower surface of the return guide to prevent the roller from colliding with the return guide other than the cover member.

2. The image recording device according to claim 1, wherein the portion of the arm is a projection.

3. The image recording device according to claim 1, wherein the portion of the arm is located between the pivot axis of the arm and the roller.

4. The image recording device according to claim 1, wherein another portion of the return guide is located above the pivot axis of the arm of the sheet feeder.

5. The image recording device according to claim 1, wherein the sheet feeder further comprises a plurality of gears configured to transmit a rotating force to the roller.

6. The image recording device according to claim 1, wherein the return guide further comprises an inclined portion having an inclined guide surface.

7. The image recording device according to claim 1, wherein the pivot axis is located at one end of the arm and the roller is rotatably supported by another end of the arm.

8. The image recording device according to claim 1, wherein the return guide is pivotable.

9. The image recording device according to claim 1, wherein when the roller moves from the first roller position toward the second roller position, the roller moves towards the return guide.

* * * * *